United States Patent [19]
Wilusz et al.

[11] Patent Number: 5,893,694
[45] Date of Patent: Apr. 13, 1999

[54] CAGED NUT FASTENER

[75] Inventors: John Wilusz, Hamilton; David J. Vidal, Beamsville, both of Canada; Jeffrey J. Cornell, Royal Oak; Robert B. Nita, Rochester Hills, both of Mich.

[73] Assignee: Eaton Corporation, Cleveland, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/948,440

[22] Filed: Oct. 10, 1997

[51] Int. Cl.⁶ .................................... F16B 39/284
[52] U.S. Cl. ............................... 411/112; 411/175
[58] Field of Search ..................... 411/103, 112, 411/113, 111, 537, 174, 175

[56] References Cited

U.S. PATENT DOCUMENTS

| | | |
|---|---|---|
| 2,144,553 | 1/1939 | Simminds .................... 411/111 |
| 2,394,729 | 2/1946 | Tinnerman ................... 411/112 |
| 2,631,634 | 3/1953 | Tinnerman . |
| 2,649,126 | 8/1953 | Tinnerman . |
| 2,695,046 | 11/1954 | Tinnerman, III . |
| 2,717,622 | 9/1955 | Flora . |
| 3,068,924 | 12/1962 | Summers ..................... 411/113 |
| 3,192,823 | 7/1965 | Munse . |
| 3,217,772 | 11/1965 | Adams . |
| 3,373,789 | 3/1968 | Parkin et al. . |
| 4,015,650 | 4/1977 | Anderson . |
| 4,826,374 | 5/1989 | Baglin ........................ 411/103 |
| 4,863,327 | 9/1989 | Poupiter ..................... 411/112 |
| 4,875,816 | 10/1989 | Peterson ..................... 411/104 |
| 5,022,804 | 6/1991 | Peterson ..................... 411/104 |
| 5,039,264 | 8/1991 | Benn ......................... 411/175 |
| 5,066,180 | 11/1991 | Lang ......................... 411/113 |
| 5,096,350 | 3/1992 | Peterson ..................... 411/112 |

*Primary Examiner*—Flemming Saether
*Attorney, Agent, or Firm*—Daniel S. Kalka; Albert E. Chrow

[57] ABSTRACT

A caged nut fastener (100) is provided that features a first arm (6) in overhanging substantially parallel spaced-apart relationship to a base portion (4) defining a cage therebetween. Arm (6) has an opening (20) therethrough having a breadth "B" through which is received a tubular end portion (18) and a portion of a frusto-conical projection (16) extending from a base (14) having a planar surface (15) in facing sliding engagement with base portion (4). The breadth of the frusto-conical projection (16) within opening (20) is sufficiently less the breadth (B) to enable the nut member to move substantially the same distance in any direction transverse to a central rotational axis ("C") extending through a threaded bore (22) in portion (18) of the nut member.

5 Claims, 1 Drawing Sheet

CAGED NUT FASTENER

INTRODUCTION

This invention relates to a caged nut fastener and more particularly to a caged nut fastener wherein the nut member is free to move within the cage substantially the same distance in any direction generally transverse to the central rotational axis of the threaded portion of the nut member.

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

Caged nut fasteners are well known in the art and provide a useful function in that they are able to hold the threaded nut at locations in a frame that are difficult or in some cases impossible to reach and thus in many applications operate as what is known in the art as "blind fasteners".

Some early examples of caged nut fasteners are disclosed in U.S. Pat. Nos. 2,631,634; 2,649,126; 2,695,046 and 2,717,622, assigned to the assignee of the present invention and the disclosure of which are included herein by reference.

Other examples of caged nut fasteners are disclosed in U.S. Pat. Nos. 3,192,823; 3,217,772; 3,373,789; 4,015,650; 4,826,374; 4,863,327; 4,875,816; 5,022,804 and 5,096,350, the disclosures of which are included herein by reference.

In all of the caged nut fasteners disclosed in the above patents, the nut member features either a square or rectangular configured base portion that is generally restricted from moving in at least one direction transversely relative the central rotational axis of the threaded portion of the nut member thus reducing the alignment possibilities with a threaded member such as a bolt or screw. The caged nut fastener of the present invention overcomes such directional movement limitation heretofore placed upon nut members of caged nut fasteners by being configured to enable movement of the nut within the cage substantially the same distance in any direction that is generally transverse to the central rotational axis of the threaded portion of the nut to enhance alignment between the threaded portion of the nut and a threaded member such as a bolt or screw.

BRIEF SUMMARY OF THE INVENTION

Accordingly, it is an object of this invention to provide a caged nut fastener. It is another object of this invention to provide a caged nut fastener wherein the nut member is configured to enable it to move substantially the same distance within the cage in any direction generally transverse to the central rotation axis of the threaded portion of the nut member to enhance the alignment possibilities with a threaded member such as a bolt or screw.

DETAILED DESCRIPTION OF THE INVENTION

Figure 1:
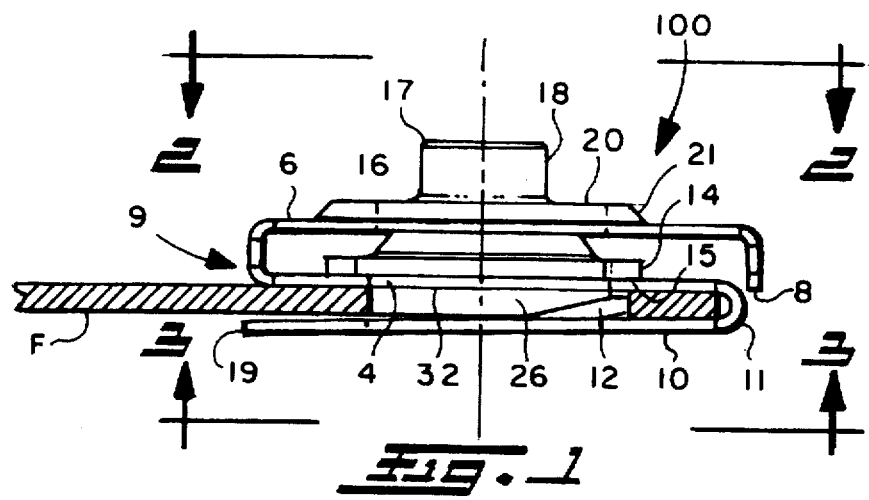
FIG. 1 is a side elevation view of a preferred embodiment of the caged nut fastener of the invention referenced by numeral 100.
Figure 2:
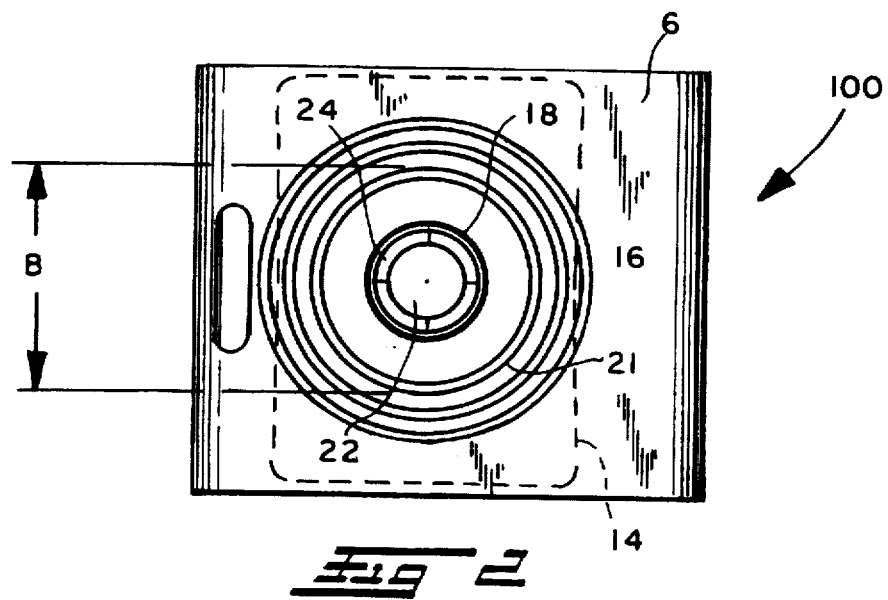
FIG. 2 is a top plan view of fastener 100 taken along view line 2—2 in FIG. 1.

Fastener 100 of FIG. 1 has a base portion 4 from one end 9 of which extends a first arm 6 that curves upwardly away from base portion 4 and thence towards the opposite end 11 thereof in substantially parallel spaced-apart facing relation with one side of base portion 4 as shown in FIG. 1. Arm 6 ends in a free-end 8 that preferably turns downward in facing adjacent relationship with end 11 of base portion 4 as shown in FIG. 1. Arm 6 has an opening 20 therethrough having a prescribed breadth "B" shown in FIG. 2. Opening 20 is preferably circular so that dimension "B" represents the diameter thereof.

A nut member having a base 14 is disposed in the space between base portion 4 and arm 6. Base 14 may have any configuration such as the rectangular configuration shown in dashed line in FIG. 2.

Base 14 however must have a breadth that is greater then breadth "B" of opening 20 to prevent it from passing therethrough.

Base 14 has a planar surface 15 in FIG. 1 that is in facing sliding engagement with base portion 4.

A frusto-conical like projection 16 extends from base 14 through opening 20 with the breadth thereof within opening 20 less than breadth "B" so that the nut member is able to move substantially the same distance in any direction generally transverse to central rotational axis "C" shown in FIG. 1.

Axis "C" is the central rotational axis of a substantially tubular portion 18 that extends from frusto-conical projection 16 to a free-end 17 as shown in FIG. 1. Portion 18 has a bore 22 extending thereunto whose side wall is provided with threads 24 referenced in FIG. 2 that are adapted to threadingly engage with threads of a threaded member such as a bolt or screw not shown.

Although not required, arm 6 of fastener 100 preferably includes an annular boss-like surface 21 shown in FIG. 1 that is disposed about the perimeter of opening 20 on the side of arm 6 facing away from base portion 4.

The means for securing fastener 100 to a frame referenced by "F" in FIG. 1 is preferably provided by fastener 100 including a second resilient arm 10 that extends downwardly away from opposite end 11 of base portion 4 and thence towards first end 9 thereof in substantial spaced-apart parallel relationship to the opposite side of base portion 4 facing away from arm 6. Arm 10 ends at free-end 19 to provide an open-ended clip operative to receive the edge of frame "F" thereunto to which fastener 100 is to be secured and held in clipped securement therewith.

As hereinafter described, base portion 4 preferably enables an opening 32 therethrough referenced in FIG. 1 whose breadth is preferably substantially the same as breadth "B" but in any case less then the breadth of base portion 14 of the nut member.

Figure 3:
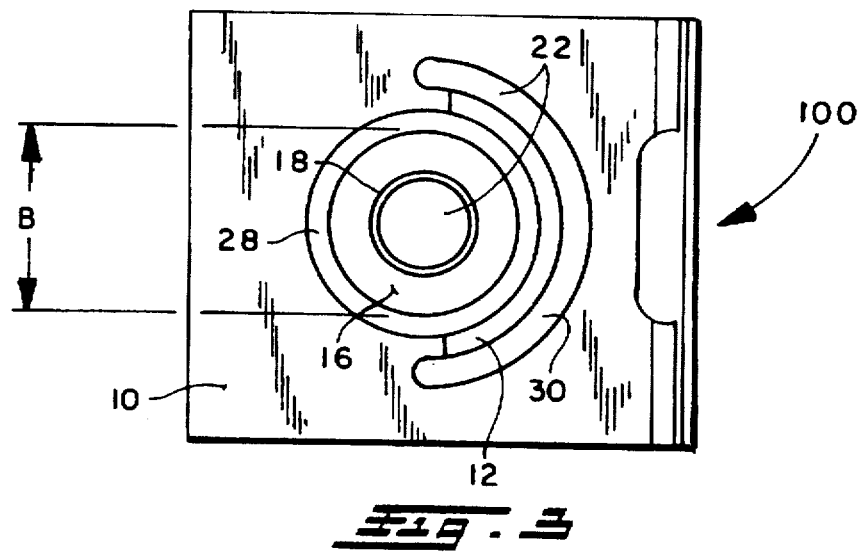
FIG. 3 is a bottom elevation view of fastener 100 taken along view line 3—3 in FIG. 1.

Arm 10 preferably includes a protuberance 12 shown in FIGS. 1 and 3 that extends angularly away therefrom in a direction towards opposite end 11 of base portion 4.

As shown in FIG. 3, protuberance 12 is preferably arcuate in configuration and, after having been bent in the direction described, leaves an arcuate shaped opening 30 in arm 10.

Protuberance 12 is operative to enter into an opening 26 in frame "F" so as to engage the perimeter thereof so as to hold opening 28 through arm 10, and opening 26 through frame "F", and opening 32 through base portion 4, and opening 20 through arm 6, in substantial registration with each other so that a threaded member can be inserted upwardly through openings 28, 26, 32 and 20 and into bore 22 for engagement with threads 24 when such is desired or vice versa so as to enable a threaded member to rotationally advance in order through tubular portion 18 and openings 20, 32, 26 and 28 when such is desired.

The caged nut fastener of the invention is thus operative to enable a nut member to move substantially the same distance in any direction substantially transverse to rotational axis "C" within the cage defined by the space between arm 6 and base portion 10.

Although the caged nut fastener of the invention may be made from a suitable plastic material, it is preferably made from a suitable metallic material or from combinations of the two.

We claim:

1. A caged nut fastener having:

a substantially flat base portion;

a first arm integral with and extending upwardly away from an end of the base portion and thence towards an opposite end thereof in spaced-apart overhanging relationship to one side thereof and defining a cage therebetween;

an opening through the first arm of prescribed breadth, an annular boss-like surface disposed circumferentially about a perimeter of the first arm opening on a side of the first arm facing away from the base portion;

a second resilient arm integral with and extending downwardly away from an end of the base member opposite that of the first arm to a free-end disposed in a spaced-apart relationship to the substantially flat base portion to provide an open-ended clip adapted to secure the base portion to a frame, the second arm and the base portion having respective openings therethrough and being in substantial registration with the first arm opening and operative for receiving a threaded member therethrough;

a nut member disposed in the space between the base portion and the first arm; said nut member having a base having a planar surface facing said one side of the base portion and being in sliding engagement therewith;

a frusto-conical like portion extending from the base of said nut member through the first arm opening to a tubular portion ending in a free-end having an open-ended threaded bore therein having a central rotational axis for receiving the threaded member therethrough;

said nut member base having a breadth larger than the first arm opening breadth by a prescribed amount and said frusto-conical portion having a diameter surrounded within the first arm opening that is less than the breadth thereof by an amount enabling the nut member to move along the base member with the first member opening substantially the same distance in any direction generally transverse to the central rotational axis of the threaded bore.

2. The caged nut fastener of claim 1 wherein the second arm includes a resilient protuberance that extends angularly therefrom towards the base portion in a direction opposite the free-end facing away from the open-ended clip and is adapted to engage a perimeter of an opening through the frame and enhance registration of the open-ended threaded bore of the nut member therewith.

3. The caged nut fastener of claim 2, wherein the protuberance is arcuate in configuration.

4. The caged nut fastener of claim 1, wherein the first arm further comprises a downwardly turned free-end in facing adjacent relationship with the opposite end of the base portion.

5. The caged nut fastener of claim 1, wherein the fastener is constructed of a material being a member selected from the group consisting of plastic, metal, and a combination thereof.

* * * * *